UNITED STATES PATENT OFFICE.

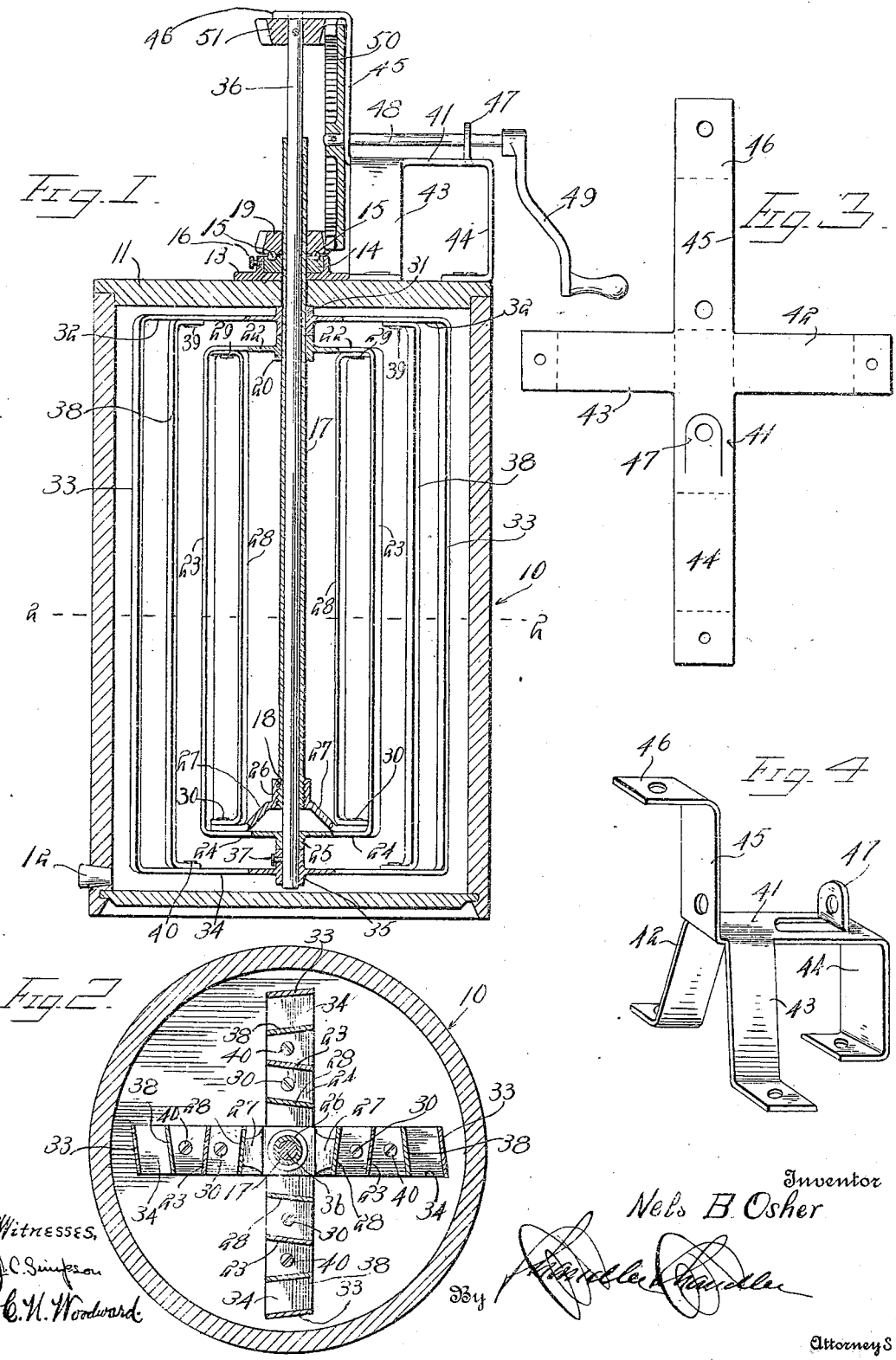

NELS B. OSHER, OF ESTHERVILLE, IOWA.

CHURN.

959,877. Specification of Letters Patent. Patented May 31, 1910.

Application filed October 12, 1909. Serial No. 522,230.

*To all whom it may concern:*

Be it known that I, NELS B. OSHER, a citizen of the United States, residing at Estherville, in the county of Emmet, State of Iowa, have invented certain new and useful Improvements in Churns; and I do hereby declare the following to be a full, clear, and exact description of the invention, such as will enable others skilled in the art to which it appertains to make and use the same.

This invention relates to improvements in churns, and has for one of its objects to improve the construction and increase the efficiency and utility of devices of this character.

With this and other objects in view, the invention consists in certain novel features of construction as hereafter shown and described and then specifically pointed out in the claims, and in the drawings illustrative of the preferred embodiment of the invention, Figure 1 is a vertical sectional elevation of the improved churn. Fig. 2 is a transverse section on the line 2—2 of Fig. 1. Fig. 3 is a view of the blank from which the supporting bracket is constructed. Fig. 4 is a perspective view of the supporting bracket detached.

The improved device comprises a receptacle, or barrel 10, preferably cylindrical, and provided with a detachable cover 11 and a draw-off plug 12. Supported upon the cover member 11 is a supporting member 13 having a socket to receive a bearing member 14, the latter having an annular groove in its upper face to receive a plurality of bearing balls 15. The bearing member 14 is supported within the socket 13 by a set screw 16 or other suitable fastening device, so that the bearings may be removed when required.

Extending through the cover 11 and likewise through the bearing 14 is a tubular shaft 17, the shaft extending to a point near the bottom of the receptacle 10 and externally threaded, the threaded portion 18 being preferably right handed, the object to be hereafter explained.

Connected to the tubular member 17 above the bearing 14 is a gear pinion 19 having an annular groove in its lower face to bear over the balls 15 of the bearing member 14. The pinion 19 is rigidly connected to the tubular member 17, and thus forms a support for the tubular member, so that it may be rotated upon the balls 15, and the friction thereby reduced to a minimum.

Mounted to rotate freely around the tubular member 17 near the closure 11 is a collar 20 having radially extending arms 22, the outer arms being directed downwardly as shown at 23, and thence directed inwardly as shown at 24, and united to a central bearing 25, as hereafter explained.

Engaging the threaded portion 18 of the tubular member 17 is a sleeve 26, the sleeve being internally threaded with a left handed thread to engage with the left handed threads of the tubular member. The sleeve 26 is provided with radial arms 27 extended for engagement with the inwardly directed portions 24 of the members 23. Extending between the members 22 and 24 are bars 28, the bars 28 being riveted at their upper ends at 29 to the radial arms 22, while the lower ends of the bars 28 are riveted to the arms 27 and 24, as shown at 30. The members 23—28 are arranged tangentially to the bars 38, as shown in Fig. 2, the object to be hereafter explained.

Fitting loosely around the tubular member 17 between the sleeve 20 and the cover member 11 is another sleeve 31, and extending laterally from this latter sleeve are arms 32 having downwardly directed portions 33, the portions 33 being directed inwardly near the bottom of the receptacle 10 as shown at 34 and united to a sleeve 35 in the center. Extending through the tubular member 17 is a shaft 36, and connected to this shaft at its lower end is the sleeve 35, the sleeve being secured detachably upon the shaft by a set screw 37.

Extending between each pair of the vertical arms 32—34 is another member 38, the member 38 being riveted or otherwise secured as shown at 39—40 respectively to the members 32—34. The members 33—38 are arranged tangentially to the tubular member 17 and the shaft 36, and reversely to the inclinations of the members 23—28 as shown in Fig. 2, the object to be hereafter explained.

Supported upon the cover 11 at one side of the shaft 36 is a supporting bracket comprising an upper portion 41, inner leg portions 42—43, an outer leg portion 44, a vertical bracket portion 45 having a perforated offset 46 at its upper end and a bearing 47 extending upwardly from the portion 41, as shown. The bracket member is constructed from a single piece of sheet or plate metal first cut into the form shown in Fig. 3 and then with the different portions bent into the form shown in Fig. 4. The lower ends of the members 42—43—44 are offset as shown and perforated to receive the holding screws or other fastening means whereby the bracket may be connected to the cover member. The offset 46 is perforated to receive the upper end of the shaft 36, which thus forms a support for the upper end of the shaft, while a driving shaft 48 is mounted for rotation through the aperture of the lug 47 and another aperture in the vertical portion 45, as shown. The shaft 48 is provided at its outer end with an operating gear wheel 50, the gear wheel engaging with the pinion 19, as shown. Connected to the shaft 36 adjacent to the offset 46 is another pinion 51 connected to the shaft 36. By this means it will be obvious that when the crank 49 is actuated the motion of the gear wheel will be imparted to the shaft 36 and to the tubular member 17, and thus rotate the members 33—38 in one direction and the members 23—28 in the opposite direction, the members 33—38 and 23—28 thus constituting the dasher elements of the improved churn, and by reason of the reversely tangential arrangement of the members the milk and cream is more thoroughly agitated and thrown alternately outwardly and inwardly, and thus materially increases the effectiveness of the agitation.

The arrangement whereby the pinion 19 is supported upon the balls 15 materially increases the efficiency and utility of the device, as the labor necessary to operate the moving parts is thereby materially decreased. By providing the tubular member 17 with the left handed threads at 18 the rotary movement of the member 17 does not cause the sleeve 26 to become loosened upon the tubular member, consequently the inner dasher members are not loosened during the churning action, while at the same time the dasher members may be readily removed from the members 17—36 by reversing the direction of motion of the tubular member and likewise releasing the set screw 37, as will be obvious.

All of the operating mechanism including the dasher members are suspended from the covering member 11, consequently the whole mechanism may be readily detached from the receptacle 10 when required. By forming the parts readily separable, they may be thoroughly cleansed when required.

What is claimed is:—

1. In a churn, a receptacle having a detachable cover, a tubular member mounted for rotation through said closure and threaded at its lower end, a sleeve internally threaded and engaging the threaded portion of the tubular member and provided with a plurality of radially extending arms, a sleeve mounted for rotation upon said tubular member and provided with a plurality of radially extending arms having downwardly directed outer portions with the lower terminals of said downwardly directed portions directed downwardly, fastening means between the radial arms of said threaded sleeve and inwardly directed portions, a shaft extending through said tubular member, a sleeve mounted for rotation upon said tubular member adjacent to said cover and provided with a plurality of radially extending arms having downwardly directed portions at the terminals thereof, the free ends of said downwardly directed portions being directed inwardly, and a sleeve carried by said shaft below said tubular member and united to the last mentioned inwardly directed portions.

2. In a churn, a receptacle having a detachable cover, an outer tubular shaft mounted for rotation through said cover and externally threaded at the lower end, an inner shaft extending through said tubular shaft and rotative therein, an outer dasher device including spaced vertical members and connected to said inner shaft below the tubular shaft and provided with a sleeve rotative upon the tubular shaft, an inner dasher device includes spaced vertical members, a threaded sleeve engaging the threaded portion of the tubular shaft and connected to said inner dasher device, and means for actuating said tubular shaft and said inner shaft in opposite directions.

3. In a churn, a receptacle having a detachable cover, a tubular shaft extending through said cover and suspended therefrom, an inner shaft extending through said tubular shaft and rotative therein, a churning element carried by said tubular shaft, another churning element carried by said inner shaft, a standard formed from a single plate of metal and comprising a base portion having depending legs, and an upwardly directed standard out-turned at its free end to form a bearing for said inner shaft, said base portion having a U-shaped cleft to provide a vertical bearing, a driving shaft extending through said vertical bearing and likewise through said standard, a pinion carried by said tubular shaft, a pinion carried by said inner shaft, and a gear wheel carried by said driving shaft and engaging said pinions.

In testimony whereof, I affix my signature, in presence of two witnesses.

NELS B. OSHER.

Witnesses:
N. J. Lee,
V. A. Combs.